United States Patent
Lane et al.

(10) Patent No.: US 7,002,961 B1
(45) Date of Patent: Feb. 21, 2006

(54) INFORMATION NETWORK VIRTUAL BACKPLANE

(75) Inventors: Robert G. Lane, Cave Cree, AZ (US); Mark A. Bakke, Maple Grove, MN (US); Timothy J. Kuik, Lino Lake, MN (US)

(73) Assignee: Storage Technology Corporation, Louisville, CO (US)

( * ) Notice: Subject to any disclaimer, the term of this patent is extended or adjusted under 35 U.S.C. 154(b) by 948 days.

(21) Appl. No.: 09/688,784

(22) Filed: Oct. 16, 2000

(51) Int. Cl.
*H04Q 11/00* (2006.01)
(52) U.S. Cl. ............. 370/395; 370/218; 709/263
(58) Field of Classification Search ........... 370/218, 370/352–364, 389–395, 402, 254; 713/201; 714/4; 709/245, 253; 711/111
See application file for complete search history.

(56) References Cited

U.S. PATENT DOCUMENTS

| | | | |
|---|---|---|---|
| 5,317,562 A * | 5/1994 | Nardin et al. ............ 370/428 |
| 5,414,704 A * | 5/1995 | Spinney ................ 370/389 |
| 5,448,675 A | 9/1995 | Leone et al. |
| 5,524,254 A * | 6/1996 | Morgan et al. ............ 709/245 |
| 5,533,201 A | 7/1996 | Benton et al. |
| 5,625,780 A | 4/1997 | Hsieh et al. |
| 5,740,171 A * | 4/1998 | Mazzola et al. ............ 370/392 |
| 5,778,203 A | 7/1998 | Birkedahl et al. |
| 5,829,041 A | 10/1998 | Okamoto et al. |
| 5,852,606 A | 12/1998 | Prince et al. |
| 5,864,555 A * | 1/1999 | Mathur et al. ............ 370/236.2 |
| 5,875,314 A | 2/1999 | Edholm |
| 5,905,859 A * | 5/1999 | Holloway et al. ............ 713/201 |
| 5,941,972 A | 8/1999 | Hoese et al. |
| 6,081,530 A * | 6/2000 | Wiher et al. ............ 370/395.53 |
| 6,260,155 B1 * | 7/2001 | Dellacona ............ 714/4 |
| 6,301,623 B1 * | 10/2001 | Simpson et al. ............ 709/253 |
| 6,373,837 B1 * | 4/2002 | Kleyman et al. ............ 370/352 |
| 6,567,403 B1 * | 5/2003 | Congdon et al. ............ 370/389 |
| 6,657,972 B1 * | 12/2003 | Syed et al. ............ 370/254 |
| 6,678,242 B1 * | 1/2004 | Simon ............ 370/218 |
| 6,779,077 B1 * | 8/2004 | Bakke et al. ............ 711/111 |

OTHER PUBLICATIONS

Hoyme K et al.: "ARINC 629 and SAFEbus*: Data Buses for Commercial Aircraft", Scientific Honeyweller, Honeywell's Corporate, Minneapolis, US, vol. 11, No. 1, 1991, pp. 57-70, XP000289742; ISSN: 0196-8440.
Blair J L et al.: "Pave Pillar in-house research final report", Proceedings of the National Aerospace and Electronics Conference. (NAECON). Dayton, May 18-22, 1992, New York, IEEE, US, vol. 2 Conf. 44, May 18, 1992, pp. 193-199, XP010064263; ISBN: 0-7803-0652-X.

* cited by examiner

*Primary Examiner*—Chi Pham
*Assistant Examiner*—Prenell Jones
(74) *Attorney, Agent, or Firm*—Brooks Kushman PC

(57) ABSTRACT

A virtual backplane includes a plurality of interconnected physical backplanes. Cards in each backplane provide an interface to various computer elements. A data interconnect forms at least one group of interconnected cards, with at least one card in each backplane connected to at least one of the data interconnect groups. A management processor supplies routing information to the cards through a network.

25 Claims, 8 Drawing Sheets

INFORMATION NETWORK VIRTUAL BACKPLANE

TECHNICAL FIELD

The present invention relates to networks interconnecting a plurality of computer elements.

BACKGROUND ART

A backplane may be used to provide high speed interconnection between computer elements such as host computers, input/output processors, communication interfaces, storage devices, and the like. The computer elements are either mounted on or communicate through printed circuit cards which are inserted into slots in the backplane. The backplane provides physical connections between the cards. Typically, an arbitration scheme implemented with a separate processor or distributed amongst the cards resolves conflicts and determines backplane usage.

While the use of backplanes provides high speed interconnection of computer elements, many problems exist. First, a backplane is typically constructed to hold a fixed number of cards. Expansion beyond that number of cards is not possible. Hence, growth of a computer system employing the backplane is severely limited. A second problem associated with backplanes is the requirement that computer elements accessing the backplane be located near the backplane. If the computer element is built onto a card, the computer element must be physically incorporated into the backplane. If the computer element communicates through a card, cabling must interconnect the card and the computer element. This cabling must generally be kept short to prevent the cabling itself from becoming a communication bottleneck.

One use of a backplane is to implement an information network, such as a storage area network (SAN). Typically, a SAN is used to interconnect one or more host computer with one or more information storage devices. These connections may be point-to-point or point-to-multipoint such as, for example, when implementing a redundant array of inexpensive disks (RAID) or tapes (RAIT). A SAN may also contain intelligence to assist in storage management, data formatting, data backup, graceful degradation, and the like.

What is needed is a backplane-based computer element interconnect that is flexible, expandable, and can interface a wide variety of computer element types.

DISCLOSURE OF INVENTION

The present invention provides a virtual backplane for an information network, such as a storage area network or local area network, interconnecting a plurality of computer elements. The virtual backplane permits the expansion of an information network beyond a single physical chassis, allowing multiple networking elements to be managed as a single entity. The virtual backplane is also flexible and expandable, permitting dynamic changes in computer element connectivity.

A virtual backplane having a plurality of physical backplanes is provided. Each backplane interconnects cards interfacing at least one computer element. A data interconnect forms at least one group of interconnected cards, with at least one card in each backplane connected to at least one of the data interconnect groups. The data interconnect may be any interconnection medium of sufficient bandwidth such as, for example, fiber channel, ATM switches, Gigabit Ethernet, and the like. A management processor supplies routing information to the cards through a network interconnecting the management processor and the cards. Each card may contain a plurality of communication ports for communicating with computer elements and the data interconnect.

In an embodiment of the present invention, the management processor assigns a unique segment address to each backplane and each group. Each card generates at least one unique address based on a card number and the segment address of the backplane containing the card.

In another embodiment of the present invention, the management processor automatically discovers to which other cards each card is directly connected. The management processor constructs a routing table for each card and sends the routing table to each card through the network.

In still another embodiment of the present invention, a routing path is formed between a requesting computer element and a responding computer element through a plurality of cards. Each card maintains at least one table of virtual connections, with each entry in the virtual connection table indicating a connection with another card.

In yet another embodiment of the present invention, the cards form multipoint routing paths between a requesting computer element and responding computer elements. Each card in more than one multipoint routing path at a point having the next card for at least one path different than the next card of another path duplicates routed information for the at least one path.

A virtual backplane with at least one management processor communicating with each data card is also provided. The management processor generates a segment number for each backplane and sends to each card the segment number of the backplane holding that card. The segment number permits each card to generate a unique address. A routing table is generated for and sent to each card. The routing table specifies at least one card to which information may be forwarded on route to any other card.

In an embodiment of the present invention, each card runs at least one application for each computer element connected to the card. Each application is assigned at least one address based on the card unique address. The management processor forwards the addresses assigned to the application to at least one additional card.

A method of communicating between cards is provided. Each card is associated with one of a plurality of backplanes. Each backplane is interconnected to at least one other backplane through a data interconnect. Each set of cards interconnected by the data interconnect forms a group. A unique segment address is generated for each backplane and each group. A routing table for each card is based on the one or more segments to which the card is associated. Each routing table specifies at least one next card to which information is routed for every destination card.

Another method of communicating between cards is provided. A management processor determines a routing table for each card. The routing table specifies to which card information is to be routed for each destination card. The routing table is determined based on the backplane to which each card is associated. Each card routing table is distributed through a communication network connecting each card with the management processor. Information received by each card is then routed based on the card routing table.

In an embodiment of the present invention, routing includes point-to-point and point-to-multipoint information transfer.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
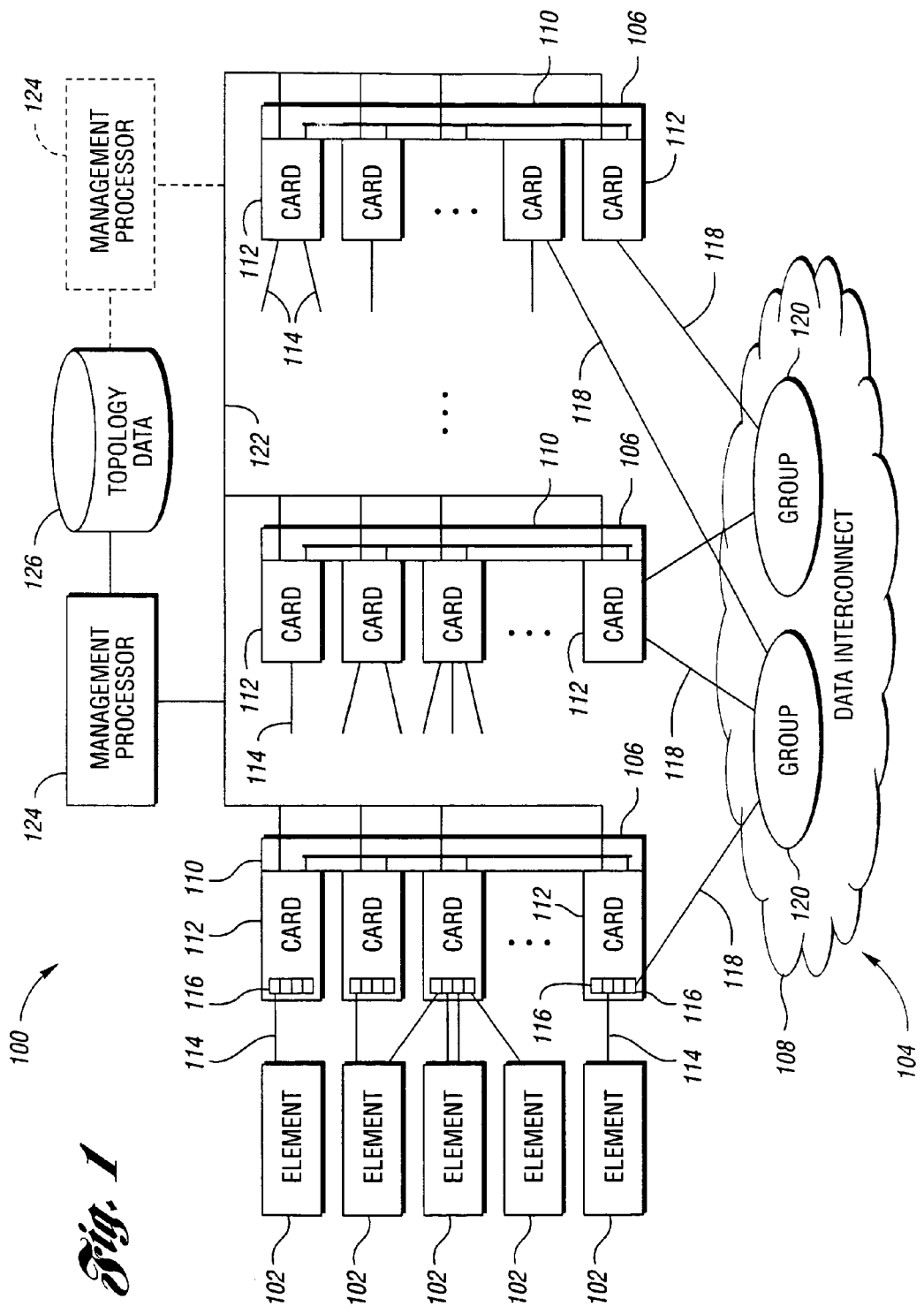
FIG. 1 is a schematic diagram illustrating a virtual backplane according to an embodiment of the present invention.

Referring to FIG. 1, a schematic diagram illustrating a virtual backplane according to an embodiment of the present invention is shown. An information network, such as a storage area network shown generally by 100, interconnects a plurality of computer elements 102. Computer elements 102 include various processing elements such as host computers and I/O processors; communication interfaces to other computer systems including those connected through the Internet, wide area networks, telecommunication systems, local area networks, and the like; storage devices such as tape drives, disk drives, memory banks, tape and disk libraries, optical storage, and the like; support elements such as data presenters, movers, translators, and the like; and system monitoring and debugging hardware. Computer elements 102 are interconnected through a virtual backplane, shown generally by 104, including a plurality of physical backplanes 106 interconnected through data interconnect 108.

Chassis 110 holds backplane 106. Cards 112 inserted into chassis 110 are electrically interconnected by backplane 106. Each card 112 may implement one or more computer elements 102. More typically, each card 112 provides an interface to virtual backplane 104 for one or more computer elements 102 connected to card 112 through link 114. Card 112 may include one or more ports 116 interfacing link 114 with card 112. Link 114 and port 116 may provide a standard interface to computer element 102. Many interface types are possible, including Fiber Channel, Small Computer System Interface (SCSI), Enterprise Systems Connection (ESCON), Intelligent Peripheral Interface (IPI), High Performance Parallel Interface (HPPI), Internet Protocol (IP), framing protocols, ATM Adaption Layer for computer data (AAL5), link encapsulation (FC_LE), Single Byte Command Code Set Mapping (SBCCSM), IEEE 802.x, and the like. Link 114 may be formed through any communication medium, such as serial cabling, parallel cabling, optical fiber, radio, infrared, and the like.

At least one card 112 in each backplane 106 is connected with data interconnect 108 through link 118. In this manner, data interconnect 108 interconnects each backplane 106 within virtual backplane 104. Data interconnect 108 may be implemented by any device or technique providing suitable bandwidth and communication properties, such as fiber channel, ATM, Gigabit Ethernet, and the like. Data interconnect 108 may be divided into one or more groups 120. At least one card 112 in each backplane 106 is connected to at least one group 120. Each group 120 thus forms an interconnection fabric connecting two or more backplanes 106.

Cards 112 are interconnected by network 122 to one or more management processors 124. Management processor 124 gathers information about the interconnectivity of cards 112 and stores this information in topology database 126. Management processor 124 then generates and distributes routing information such as, for example, a routing table, to cards 112. A second management processor 124 may be connected to network 122 and may serve as a backup in the event primary management processor 124 fails.

Figure 2:
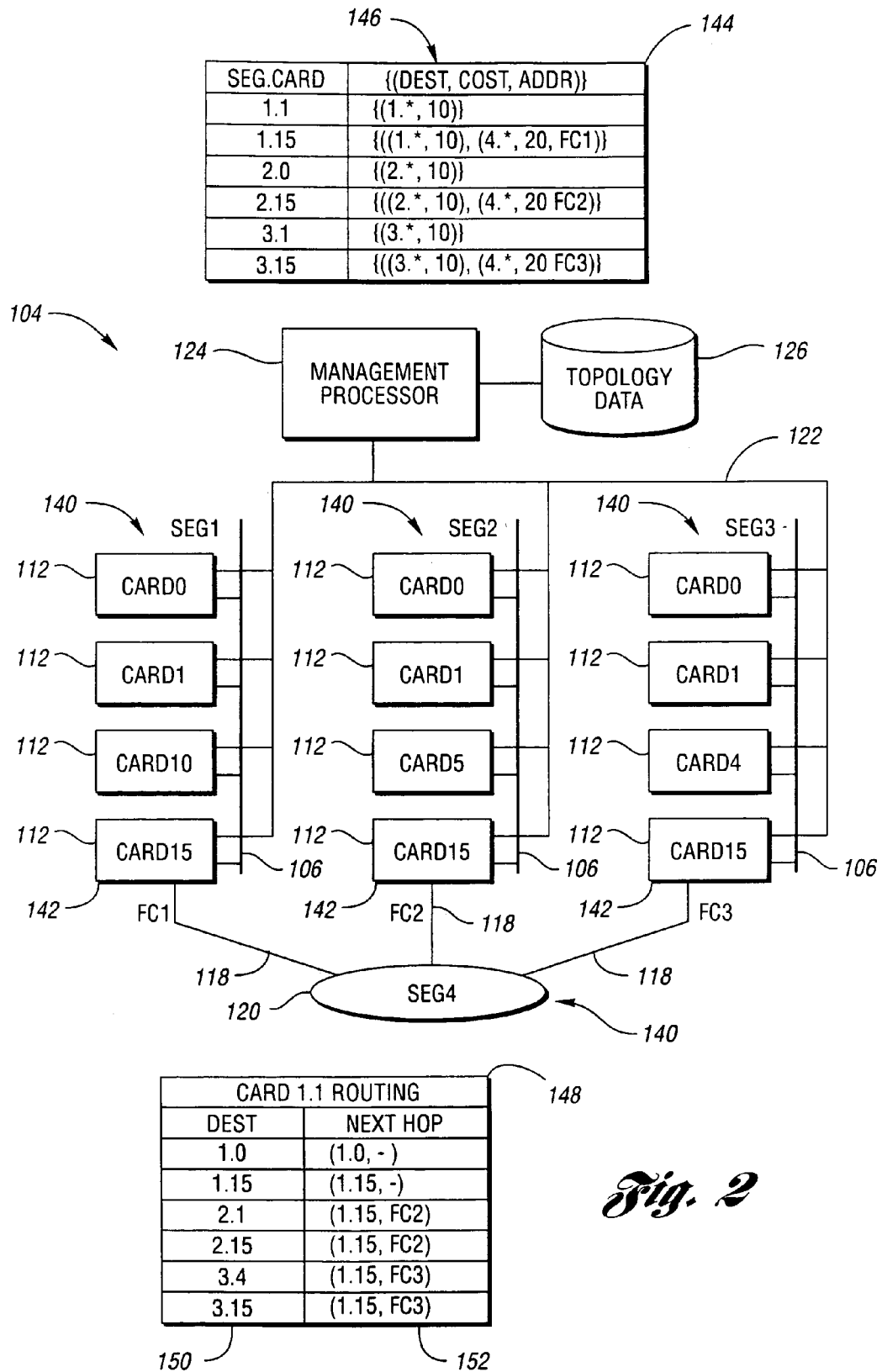
FIG. 2 is a schematic diagram illustrating routing determination in a virtual backplane according to an embodiment of the present invention.

Referring now to FIG. 2, a schematic diagram illustrating routing determination in a virtual backplane according to an embodiment of the present invention is shown. Each set of directly interconnected cards 112 is a segment, shown generally by 140. Hence, each backplane 106, each group 120, and network 122 are each one segment 140. When virtual backplane 104 is initialized, such as on power up or following a component crash, each segment is detected and provided with a segment identification (ID). For backplanes 106, assignment of a segment ID may be accomplished in one of several ways. First, each backplane 106 may be assigned a static and permanent value. Second, a segment ID can be derived from the serial number of chassis 110 containing backplane 106. A slight probability exists that chassis 110 of different types may have the same serial number. A type identifier may, therefore, be used together with the chassis serial number to derive a unique segment ID for each backplane 106. Third, the IP address for the ethernet port used to connect network 122 on each card 112 may be used to derive the segment ID for each backplane 106.

Each group 120 has a system-wide unique connection identification. In one embodiment, each group 120 is assigned a segment ID. The segment ID for each group 120 may be statically assigned. Preferably, virtual backplane 104 dynamically determines the segment ID for each group 120. Each card 112 connected to group 120 forms bridge 142 between backplane 106 to which card 112 is connected and any other backplane 106 connected to group 120. During initialization, each bridge 142 detects every other bridge 142 to which it is connected through group 120. In another embodiment, each backplane 106 may include one or more interconnect segments. Each interconnect segment represents the connection for backplane 106 in one or more groups 120.

Once an ID has been assigned to each segment 140, the segment ID for each one or more segments 140 associated with each card 112 is forwarded to that card by management processor 124. Each card then forms a unique address by combining the segment ID with the slot position of card 112 within backplane 106. If card 112 includes more than one port 116, each port is further assigned an address based on the segment ID, card number, and port number. A unique, system-wide address results of the form SEG.CARD.PORT. For example, 1.12.3 represents port 3 on card 12 in segment 1. Without loss of generality, port addresses will be dropped from examples unless otherwise specified.

Once each card 112 has an assigned address, management processor 124 begins collecting information to generate topology database 126. Topology data includes registered information table 144, a portion of which is illustrated in FIG. 2. For each card 112 a set of connectivity information, such as is indicated by 146, is established. For example, card 0 on segment 2, indicated by table entry 2.0, is directly connected to every other card in backplane 106 identified as segment 2 (SEG2). This is indicated in connectivity information 146 by card 2.0 having a destination 2.*. Connectivity information 46 may also include a cost factor. In this example, card 2.0 can reach every other card in segment 2 at a cost of 10. Each bridge card 142 contains two sets of connectivity information. For example, card 1.15 is connected to every other card in backplane 106 designated segment 1. Card 1.15 is also connected to every other card in group 120, indicated as segment 4 (SEG4), through fiber channel 1 (FC1). The relative cost of communicating through segment 4 is 20.

Once management processor 124 has constructed topology database 126, a routing table for each card 112 is constructed by management processor 124 and sent to that card 112 through network 122. Construction of routing tables may be performed using well known methods such as, for example, Dijkstra's algorithm may be used to compute the open shortest path first. An example routing table subset for card 1.1 is indicated by 148. Each routing table 148 lists each card 112, indicated as destination card 150, to which information can be sent from source card 112. For each destination 150, the next card or next hop 152 along the path between card 112 and destination 150 is listed. In the simple example shown, only one next hop 152 is provided for each destination 150. However, virtual backplane 104 may support multiple paths and, hence, multiple next hops 152 between source card 112 and a given destination card 150.

Each card 112 uses its routing table 148 to establish connections between virtual backplane addresses. Connections are established using a signaling protocol similar to ATM UNI which performs the necessary steps to establish the connection, or virtual circuit, through the system. This connection allows the application to move data to another location by tagging frames with the appropriate connection identifier and placing these frames on a backplane data path transmit cue within card 112. The data will then be delivered by virtual backplane 104 to an application at the other end of the connection.

In this manner, virtual backplane 104 sets up bidirectional connections with symmetric or asymmetric bandwidth reservation to other cards 112. Connection set up generally proceeds as follows. Source card 112 receives a request to transmit information from an application accessing card 112. This application may be running on port 116 or on computer element 102. Card 112 allocates the necessary bandwidth on backplane 106 or rejects the request. If the request is accepted, card 112 allocates a connection ID. Card 112 looks up destination 150 in routing table 148. After obtaining next hop 152 from routing table 148, card 112 sends a signaling message to next hop 152.

If destination 150 is not in the same segment 140 with source card 112, bridge 142 is next hop 152 from source card 112. Bridge 142 reserves bandwidth on backplane 106 or rejects connection with source card 112. Bridge 142 allocates connection for bridge operation and initiates a connection set up to the next hop in the route to destination 150. Bridge 142 places a connection entry in both a virtual connection table and a bridge table. Bridge 142 then acknowledges connection set up with source card 112.

Eventually, destination 150 receives a request for set up. Destination card 150 allocates bandwidth or rejects the request. If the request is accepted, destination 150 places an entry representing the connection in a virtual connection table. Destination card 150 then sends acknowledgment back to source card 112. A reverse path from destination 150 to source 112 may then be established. This reverse path may have a different bandwidth then allocated for the forward path. Once connection is established, messages may be exchanged between source 112 and destination 150 through intermediate hops 152 if any are used.

Figure 3:
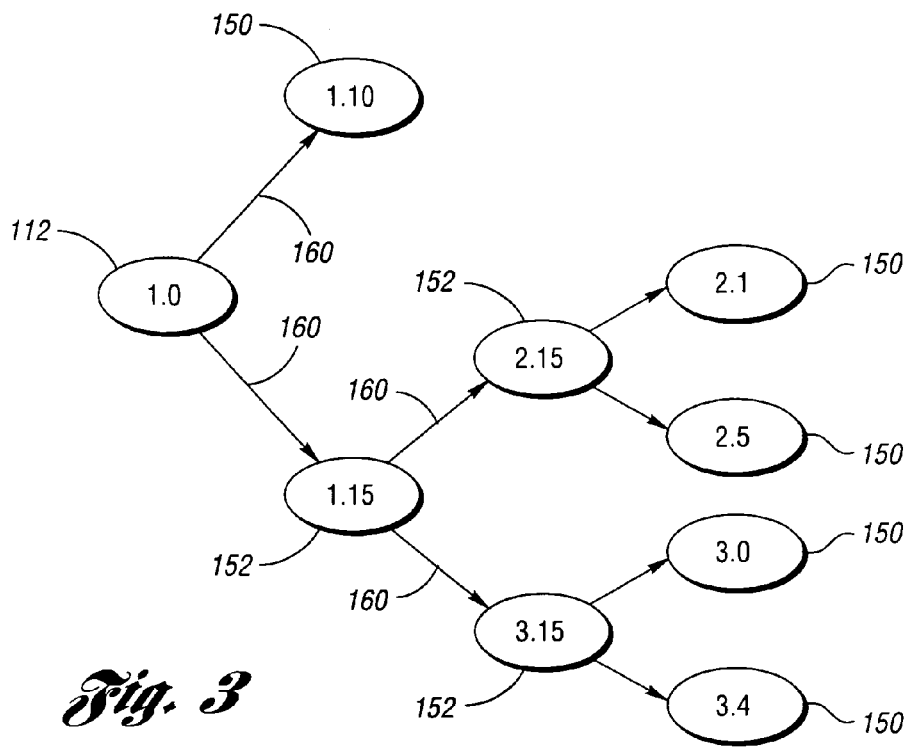
FIG. 3 is a block diagram illustrating point-to-multipoint broadcasting paths according to an embodiment of the present invention.

Referring now to FIG. 3, a block diagram illustrating point-to-multipoint broadcasting paths according to an embodiment of the present invention is shown. In point-to-multipoint communication, one source 112 generates information for distribution to a plurality of destinations 150. Source card 112 and each intermediate card 152 may form more than one connection path, indicated by 160, if that card 112, 152 is at a point in the multipoint routing path between source 112 and destinations 150 where the next card 150, 152 for at least one path is different then the next card 150, 152 of another path. Cards 112, 152 supporting multiple connection paths 160, duplicate received information and forward copies along each path 160 to connected cards 150, 152.

Figure 4:
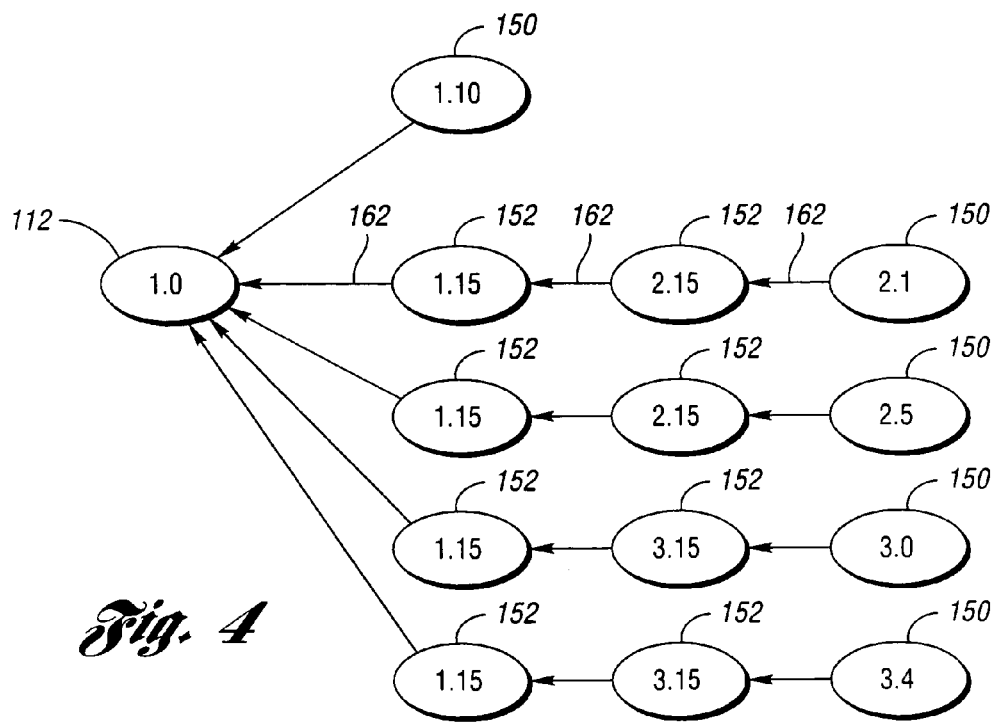
FIG. 4 is a block diagram illustrating return paths for point-to-multipoint broadcasting according to an embodiment of the present invention.

Referring now to FIG. 4, a block diagram illustrating return paths for point-to-multipoint broadcasting according to an embodiment of the present invention is shown. Each destination 150 may also establish a return path to source card 112. This is typically, though not necessarily, through the same intermediate hops 152 which formed the forward path from source 112 to destination 150. The reverse path from destination 150 to source 112 is a point-to-point route with each segment formed by return path 162 from each destination 150 or intermediate hop 152 to the next intermediate hop 152 or source 112.

Figure 5:
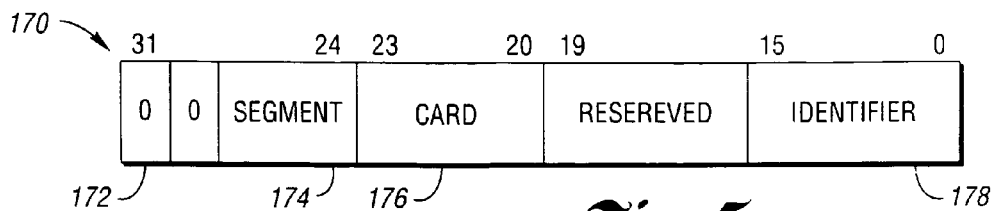
FIG. 5 illustrates a virtual backplane address according to an embodiment of the present invention.

Referring now to FIG. 5, a virtual backplane address according to an embodiment of the present invention is shown. A virtual backplane address, shown generally by 170, identifies entities communicating through card 112. Type bit 172 is cleared to indicate virtual backplane address 170. Segment identifier 174 identifies a physical backplane 106. Likewise, card identifier 176 identifies a card 112. Entity identifier 178 is assigned by card 112 to an addressable entity. Addressable entities may include processors on card 112, port 116, an application program running on port 116 or computer element 102, computer element 102 itself, and the like. Virtual backplane address 170 may be forwarded to management processor 124 for distribution to any other card 112 that may communicate with the addressable entity. Alternatively, virtual backplane address 170 may be broadcast over backplanes 106 and data interconnect 108.

Figure 6:
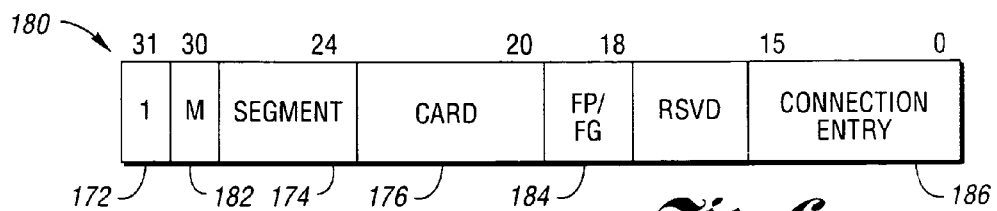
FIG. 6 illustrates a virtual backplane connection identification according to an embodiment of the present invention.

Referring now to FIG. 6, a virtual backplane connection identification according to an embodiment of the present invention is shown. A connection ID, shown generally by 180, identifies a connection between a source 112 and one or more destinations 150. Type bit 172 is set to indicate connection ID 180. Multicast designator 182 indicates whether the represented connection is point-to-point or point-to-multipoint. Segment ID 174 and card ID 176 indicate the backplane 106 and card 112, respectively, of the connection initiator. Port/group identifier 184 indicates the port 116 or group 120 associated with this connection for card 112 supporting multiple ports 116. Connection entry 186 indicates the specific connection for each segment 106, card 112, and port 116. Connection entry 186 may serve as an address into a table of virtual connection entries.

Figure 7:
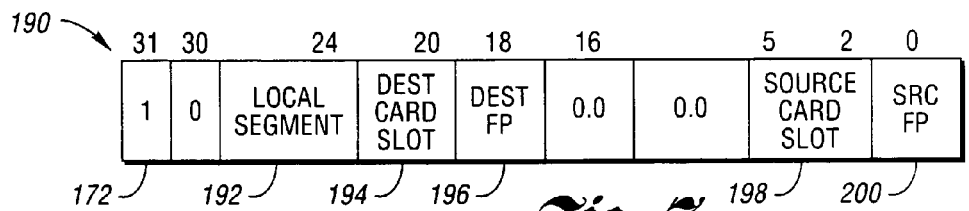
FIG. 7 illustrates a virtual backplane signaling connection identification according to an embodiment of the present invention.

Referring now to FIG. 7, a virtual backplane signaling connection identification according to an embodiment of the present invention is shown. A signaling connection ID, shown generally by 190, identifies a signaling connection between cards 112 on a particular backplane 106. Type bit 172 is set to one. Local segment identifier 192 indicates the number of segment 140 assigned to backplane 106 containing source card 112 and destination card 112 of the signal message. Destination card slot 194 is the slot within backplane 106 holding the signaling communication destination card 112. Likewise, destination port identifier 196 specifies communication destination port 116 on destination card 112. Source card slot 198 identifies the slot in backplane 106 holding source card 112 generating the signaling communication. Likewise, source port identifier 200 specifies originating port 116 on source card 112.

Signaling connections to each port 116 in each chassis 110 are set up during initialization. All data connection signaling takes place through these static connections. Each card 112 initializes a preset number of entries in each virtual connection table to establish the signaling connections. These connections carry signaling traffic through virtual backplane 104 whenever signaling is performed, independent of management processor 124 and network 122. Thus, when card 112 determines a data signaling message is to be sent, card 112 finds an appropriate signaling connection ID 190 using knowledge of local segment identifier 192, destination card number 194, and destination port identifier 196.

Figure 8:
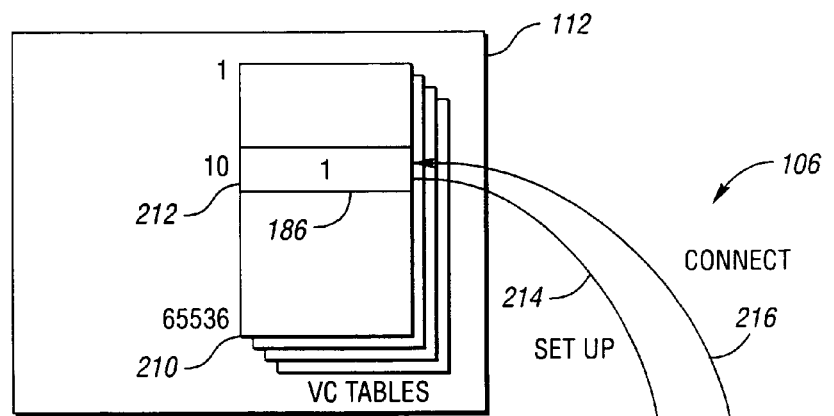
FIG. 8 is a block diagram illustrating intrasegment point-to-point communication according to an embodiment of the present invention.
Figure 8:
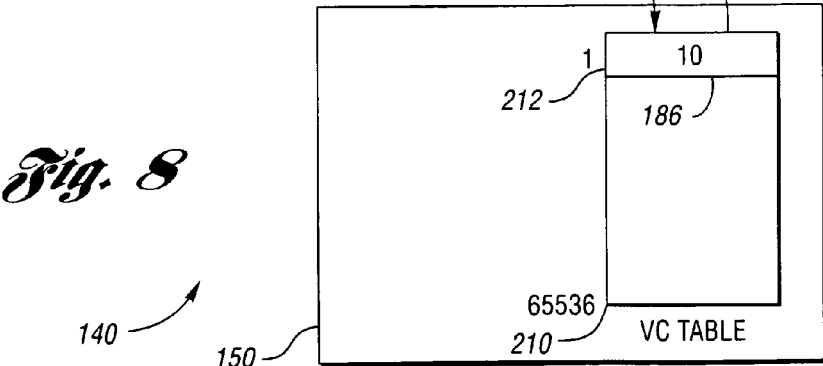

Referring now to FIG. 8, a block diagram illustrating intrasegment point-to-point communication according to an embodiment of the present invention is shown. Segment 140 includes source card 112 and destination card 150. Each card 112, 150 has at least one virtual connection table 210. Typically, each card 112, 150 will have one virtual connection table 210 for each port 116. Virtual connection table 210 holds connection IDs 180. Only a portion of each connection ID 180 is shown in each virtual connection table 210.

When source 112 wishes to establish the data connection, it first reserves virtual connection table entry 212. Source 112 then sends set up message 214 including the address of virtual connection table entry 112 to destination 150 through interconnect 106. Destination 150 reserves virtual connection table entry 212 in an appropriate virtual connection table 210 and stores the received address as connection entry 186. Destination 150 responds with connection message 216 sent through backplane 106 to source 112, including the address of the reserved location in destination virtual connection table 210. Source 112 stores the received address as connection entry 186.

Figure 9:
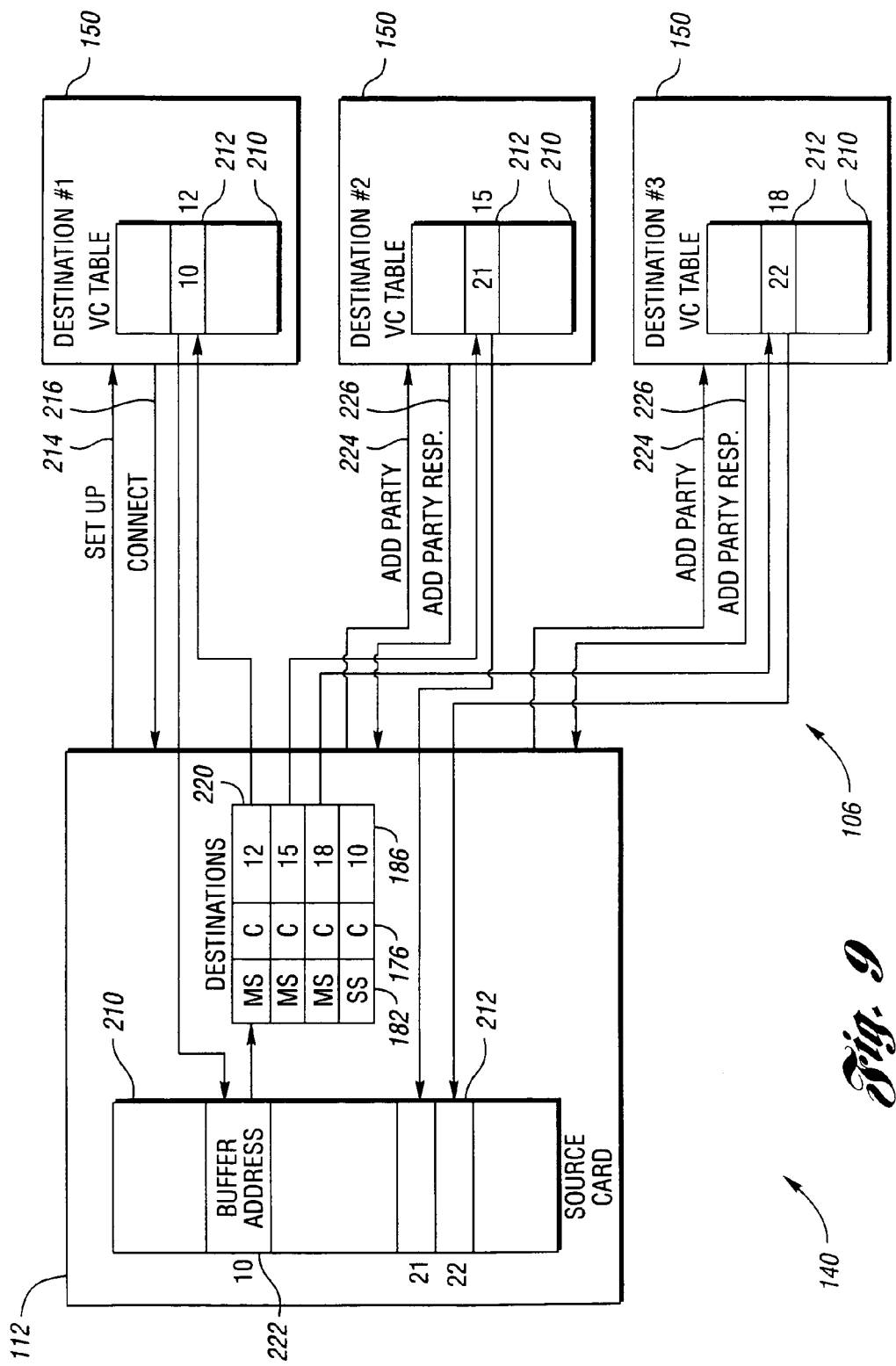
FIG. 9 is a block diagram illustrating intrasegment point-to-multipoint communication according to an embodiment of the present invention.

Referring now to FIG. 9, a block diagram illustrating intrasegment point-to-multipoint communication according to an embodiment of the present invention is shown. Source 112 wishes to multicast information to three destinations 150 within the same group 140. Source 112 sends set up message 214 to the first destination 150 and receives connection message 216 from first destination 150 in the same manner as described above. However, instead of placing connection entry 186 for first destination 150 in virtual connection table 210, source 112 forms buffer 220 pointed to by buffer address 222. Source 112 then enters connection ID 180 into buffer 220 with multicast designator 182 set.

Source 112 reserves a second entry in virtual connection table 210 and forwards the address of this entry to second destination 150 in add party message 224. If conditions warrant, second destination 150 reserves a connection in virtual connection table 210 and replies with the address in add party response 226. Source 112 receives add party response 226 and places the second connection ID 180 with multicast designator 182 set into buffer 220. The process is repeated again for the third destination 150. A final entry into buffer 220 is connection ID 180 with multicast designator 182 cleared pointing back to entry 212, containing buffer address 222, in virtual connection table 210.

Figure 10:
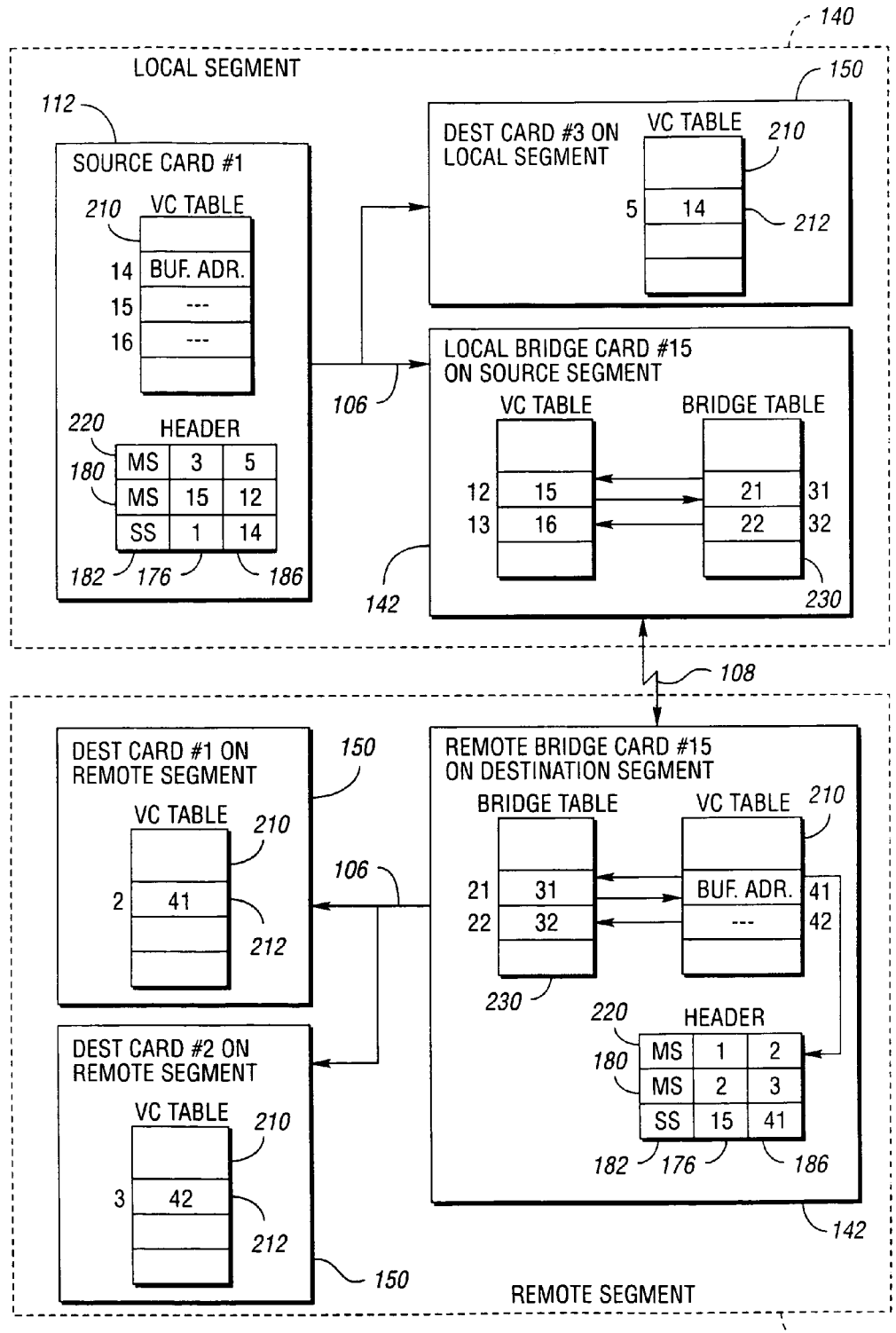
FIG. 10 is a block diagram illustrating intersegment point-to-multipoint communication according to an embodiment of the present invention.

Referring now to FIG. 10, a block diagram illustrating inter segment point-to-multipoint communication according to an embodiment of the present invention is shown. Source card 112 is set up to multicast with three destination cards 150. The first destination card 150 is local card 3 connected to source card 112 through backplane 106. The remaining two cards are card 1 and card 2 in a segment 140 remote from source 112. Remote segment 140 is connected to segment 140 defining backplane 106 containing source 112 through data interconnect 108. Each segment 140 interfaces with data interconnect 108 through bridge card 142 numbered 15.

Source card 112 includes virtual connection table 210 with location 14 pointing to buffer 220. Buffer 220 includes two connection IDs 180 with multicast designator 182 set. The first such connection ID 180 points to virtual connection table entry 212 (table address 5) on local destination card 150 (CARD 3). The second connection ID 180 in buffer 220 points to virtual connection table 210 in bridge card 142 (CARD 15). When local bridge card 142 accepted the connection request from source card 112, local bridge card 142 established connection with remote bridge card 142 using bridge table 230. Local bridge card 142 reserved an entry in bridge table 230 and forwarded the address of this entry to remote bridge card 142. Remote bridge card 142 reserved an entry in bridge table 230 and stored as connection entry 186 the received address. Remote bridge card 142 responded by forwarding the address of its reserved location to local bridge card 142. Local bridge card 142 stored this address as connection entry 186 in bridge table 230.

Remote bridge card 142 reserved an entry in virtual connection table 210 for a pointer to buffer 220. Buffer 220 contains two connection IDs 180 with multicast designator 182 set, one for each destination card 150 on the same backplane 106 as remote bridge card 142. Remote bridge card buffer 220 also includes one connection ID 180 with multicast designator 182 cleared pointing to the buffer address location in virtual connection table 210 of remote bridge card 142.

When an application wishes to send a multicast communication from source 112, it refers to address 14 in virtual connection table 210. Card 112 then examines buffer 220 and determines that two multicast messages must be sent. The first multicast message is sent to address 5 in virtual connection table 210 of local destination card 150 (CARD 3). The second multicast message is sent to address 12 of virtual connection table 210 on local bridge card 142 (CARD 15). When local bridge card 142 receives a message tagged with connection ID 180 having connection entry 186 set to 12, local bridge card 142 uses bridge table 230 to determine that the message must be forwarded to destination bridge card 142. Upon receipt of the message, remote bridge card 142 uses buffer 220 accessed through virtual connection table 210 to determine that two copies of the message must be sent. Remote bridge card 142 forwards one copy of the message to each destination card 150 referenced by connection ID 180 in buffer 220 with multicast designator 182 set.

Each destination card 150 has a return path to source card 112. For example, remote destination card 150 (CARD 2) transmits a return message to remote bridge card 142 using connection ID 180 with connection entry 186 set to 42. Remote bridge card 142 forwards the return message to local bridge card 142 using connection ID 180 with connection entry 186 set to 32. Local bridge card 142 finally forwards the message to source card 112 using connection ID 180 with connection entry 186 set to 16. Mapping between bridge table 230 and virtual connection table 210 in bridge 142 may be through a third table, may be through an additional entry in each table 210, 230, or may be through the sue of corresponding addresses in tables 210, 230.

Figure 11:
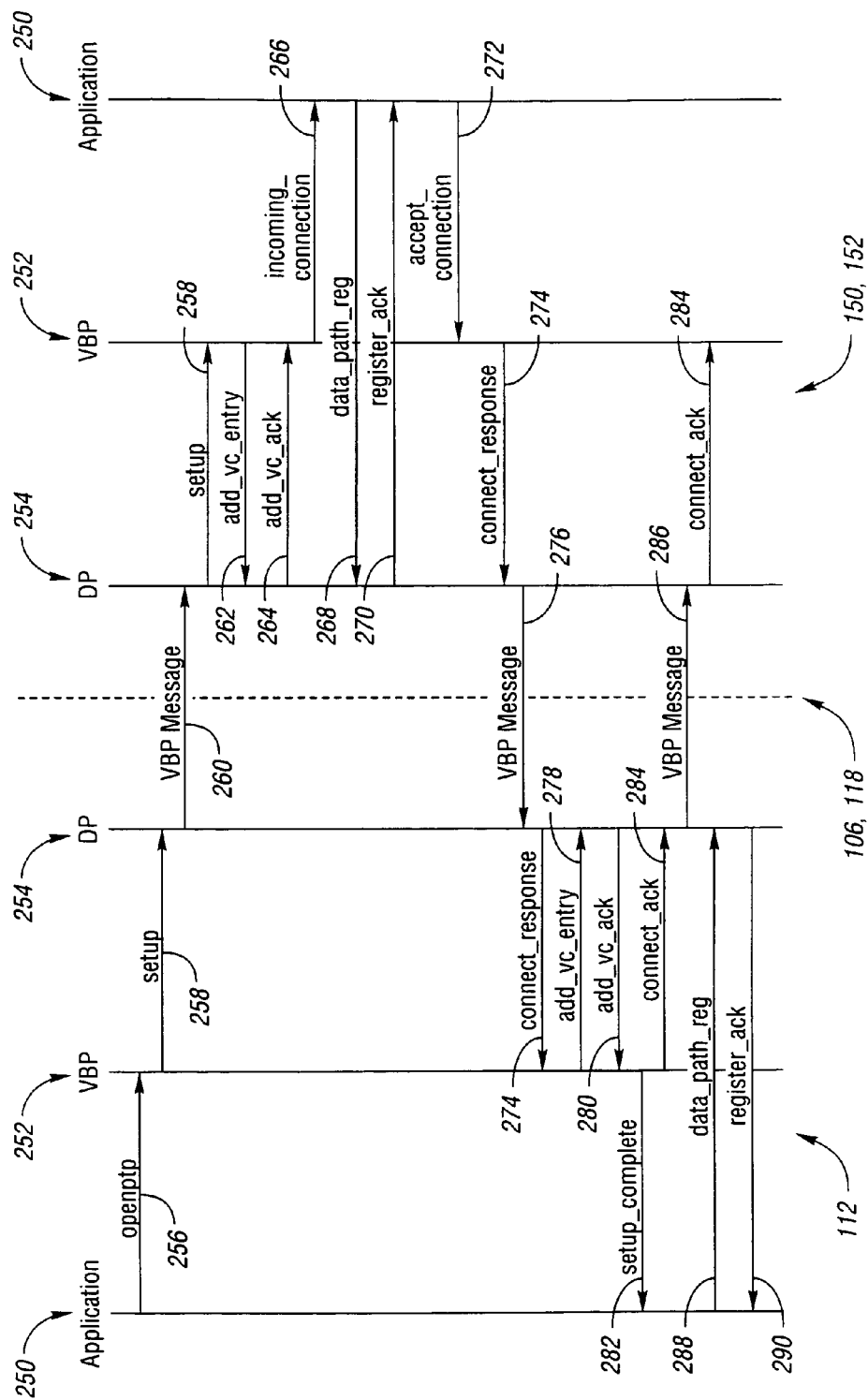
FIG. 11 is a message flow diagram illustrating connection set up according to an embodiment of the present invention.

Referring now to FIG. 11, a message flow diagram illustrating connection set up according to an embodiment of the present invention is shown. Each card 112, 150, 152 includes three processes, application interface 150, virtual backplane (VBP) interface 152, and data path (DP) interface 154. Preferably, each port 116 includes application interface 250. Alternatively, application interface 250 may run on card 112, 150, 152 without port 116 or may run on computer element 102. VBP interface 252 establishes and maintains connection in formation such as virtual connection tables 210. Data path interface 254 cues information for transmission across backplane 106 or link 118 and receives information from backplane 106 or link 118.

Connection is initiated by application interface 150 sending open message 256 to VBP interface 252. In the example shown, a point-to-point connection is requested. This request may include the source virtual backplane address, the destination backplane address, the forward path bandwidth, the reverse path bandwidth, and any application context. VBP interface 252 then sends set up message 258 to data path interface 254. Data path interface 254 in source 112 forwards set up message 258 to data path interface 254 in destination 150, 152. VBP interface receives set up message 258. VBP interface 252 interprets set up request 258 and generates add virtual connection request 262 for data path interface 254. Data path interface 254 creates an entry in virtual connection table 210 and forwards the address to VBP interface 252 in add virtual request acknowledge 264. VBP interface 252 then sends incoming connection message 266 containing connection ID 180 and the target address to application interface 250. Application interface 250 forwards connection ID 180 to data path interface 254 using data path registration 268. After receiving registration acknowledge 270, application interface 250 sends accept connection message 272 with connection ID 180 to VBP interface 252. VBP interface 252 forwards connect response 274 to data path interface 254 for forwarding to source 112.

Upon receiving VBP message 276, data path interface 254 in source 112 forwards connect response 274 to VBP interface 252. VBP interface 252 makes an entry into virtual connection table 210 by sending add virtual connection request 278 to data path interface 254. Data path interface 254 responds with add virtual connection acknowledge 280. VBP interface 252 notifies application interface 250 through set up complete message 282. VBP interface 252 also sends connection acknowledge 284 to data path interface 254, which transmits acknowledge 284 to data path interface 254 in destination 150, 152 through VBP message 286. VBP interface in destination 150, 152 then receives connection acknowledge 284. Application interface 250 in source 112 forwards connection ID 180 to data path interface 254 in data path registration 288. Data path interface 254 responds with registration acknowledge 290.

In the above discussion, each request was followed by a positive response. However, a negative response at any point along the process will result in a proper release of all resources. For example, if data path interface 254 responds negatively to add virtual connection request 262, VBP interface 252 will not forward connection ID 180 to application interface 250 and will generate a message to its corresponding VBP interface 252 that connection could not be established. Message timeouts are also provided. For example, VBP interface 252 measures the time between sending set up message 258 and receiving connect response 274. If this time exceeds a threshold, application interface 250 is informed of a connection failure. Similarly, VBP 252 measures the time between sending connect response 274 and receiving connect acknowledge 284. If this time exceeds a threshold, VBP interface 252 notifies application interface 250 of a connection failure and VBP interface 252 notifies data path interface 254 to release virtual connection table entry 212.

Figure 12:
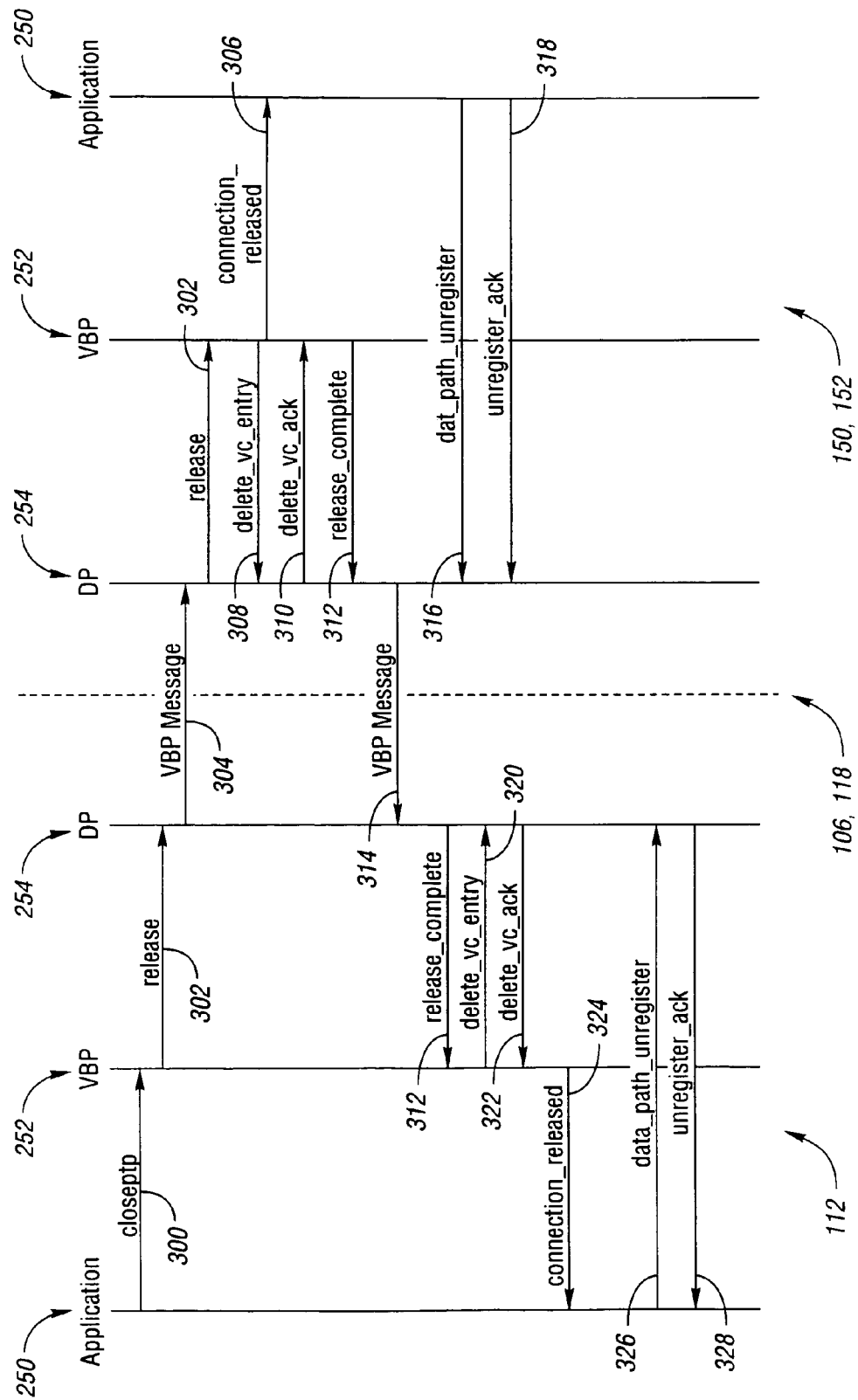
FIG. 12 is a message flow diagram illustrating connection tear down according to an embodiment of the present invention.

Referring now to FIG. 12, a message flow diagram illustrating connection tear down according to an embodiment of the present invention is shown. Application interface 250 sends close message 300 to VBP interface 252, which responds by sending release message 302 to data path interface 254. Data path interface 254 in source 112 generates VBP message 304 for delivery to data path interface 254 in destination 150, 152. Data path interface 254 in destination 150, 152 forwards release message 302 to VBP interface 252. VBP interface 252 sends connection released message 206 to application interface 250 and sends delete virtual connection request 308 to data path interface 254. VBP interface 252 receives delete virtual connection acknowledge 310 from data path interface 254 and generates release complete message 312. Data path interface 254 sends release complete message 312 as VBP message 314. After receiving connection released 306 application interface 250 releases the data path by sending data path unregister message 316 to data path interface 254. Data path interface 254 response with unregister acknowledge 318.

When VBP interface 252 in source 112 receives release complete message 312 from data path interface 254, VBP interface 252 generates delete virtual connection request 320. After deleting virtual connection entry 212, data path interface 254 response with delete virtual connect acknowledge 322. VBP interface 252 sends connection released message 324 to application interface 250. Application interface 250 releases data path resources by sending data path interface 254 data path on register 326. Data path interface 254 responds with unregister acknowledge 328.

All connections are monitored for activity. In one embodiment, any connection without activity after an amount of time is automatically and unilaterally shutdown. This amount of time may be preset or determined from conditions in virtual backplane 104 such as traffic load, access request load, connection type, connection source, and the like. In an another embodiment, such an aged connection results in a query through the connection prior to connection dissolution. Also, if all entries in virtual connection table 210 have been used, new requests for connection may be serviced by terminating the connection corresponding to virtual connection entry 212 with the most time since the last activity.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A virtual backplane for an information network interconnecting a plurality of computer elements comprising:
   a plurality of physical backplanes, each backplane interconnecting a plurality of cards, at least one card in each backplane interfacing at least one computer element;
   a data interconnect comprising at least one group, at least one card in each backplane connected to at least one group;
   at least one management processor supplying routing information to the plurality of cards; and
   a network interconnecting the at least one management processor and the plurality of cards.

2. A virtual backplane as in claim 1 wherein at least one card comprises a plurality of communication ports.

3. A virtual backplane as in claim 1 wherein the data interconnect comprises at least one fiber channel.

4. A virtual backplane as in claim 1 wherein the data interconnect comprises at least one ATM switch.

5. A virtual backplane as in claim 1 wherein the data interconnect comprises Gigabit Ethernet.

6. A virtual backplane as in claim 1 wherein the management processor provides at least one routing table to each card, each card routing information to another card based on the routing table.

7. A virtual backplane as in claim 1 wherein the management processor assigns a unique segment address to each backplane and to each group.

8. A virtual backplane as in claim 7 wherein each card generates at least one unique address based on a card number and the segment address of the backplane containing the card.

9. A virtual backplane as in claim 1 wherein the management processor automatically discovers to which cards each card is connected.

10. A virtual backplane as in claim 9 wherein the management processor constructs a routing table for each card and sends the constructed routing table to the card through the network.

11. A virtual backplane as in claim 1 wherein a routing path is formed between a requesting computer element and a responding computer element through a plurality of cards.

12. A virtual backplane as in claim 11 wherein each card maintains at least one table of virtual connections, each entry in the virtual connection table indicating a connection with another card.

13. A virtual backplane as in claim 1 wherein the cards form a plurality of multipoint routing paths between a requesting computer element and a plurality of responding computer elements.

14. A virtual backplane as in claim 13 wherein each multipoint routing path between the requesting computer element and one responding computer element is through a plurality of cards, each card in more than one multipoint routing path at a point having the next card for at least one path different than the next card of another path duplicating routed information for the at least one path.

15. A virtual backplane for an information network interconnecting a plurality of computer elements comprising:
   a plurality of physical backplanes, each backplane interconnecting a plurality of cards, at least one card in each backplane interfacing at least one computer element;
   a data interconnect interconnecting at least one card in each backplane;
   at least one management processor in communication with each data card, the at least one management processor operative to
   (a) generate a segment number for each backplane, the segment number permitting each card to generate a unique address,
   (b) send to each card the segment number of the backplane holding the card,
   (c) automatically generate a routing table for each card, the routing table specifying at least one card to which information is forwarded on route to any other card, and
   (d) send the routing table to each card.

16. A virtual backplane as in claim 15 wherein each card runs at least one application for each computer element connected to the card, each application assigned at least one address based on the card unique address, the management processor further operative to forward the at least one address to at least one additional card.

17. A virtual backplane as in claim 15 wherein the management processor communicates with each data card through a communication network separate from the data interconnect.

18. A virtual backplane as in claim 15 further comprising at least on group of cards interconnected by the data interconnect, the management processor further operative to generate a segment number for each group.

19. A method of communicating between cards, each card associated with one of a plurality of backplanes, the method comprising:
   interconnecting each backplane to at least one other backplane through a data interconnect, each set of cards interconnected by the data interconnect forming a group;
   generating a unique segment address for each backplane and each group; and
   determining a routing table for each card based on at least one segment to which the card is associated, each routing table specifying at least one next card to route information for every other destination card.

20. A method of communicating between cards as in claim 19 wherein an address for each card is determined based on the segment address for the backplane with which the card is associated.

21. A method of communicating between cards as in claim 19 wherein determining the routing table comprises:
   determining the routing table for each card at a management processor in communication with the card; and
   distributing the routing table from the management processor to the card.

22. A method of communicating between cards, each card associated with a backplane, at least one card in each backplane connected to a data interconnect, the method comprising:
   determining, in a management processor, a routing table for each card, the routing table specifying to which card information is to be routed for each destination card, the routing table determined based on the backplane to which each card is associated;

distributing each card routing table to the card through a communication network connecting each card with the management processor; and routing information received by each card based on the card routing table.

23. A method of communicating between cards as in claim 22 wherein the data interconnect comprises at least one group, each group comprising cards interconnected by the data interconnect, the method further comprising assigning a unique segment address to each backplane and each group.

24. A method of communicating between cards as in claim 22 wherein each card is assigned a unique address based on the segment address of the backplane with which it is associated.

25. A method of communicating between cards as in claim 22 wherein routing comprises point-to-multipoint information transfer.

* * * * *